J. P. LOONEY.
STARTING DEVICE.
APPLICATION FILED AUG. 10, 1910.
984,948.
Patented Feb. 21, 1911.
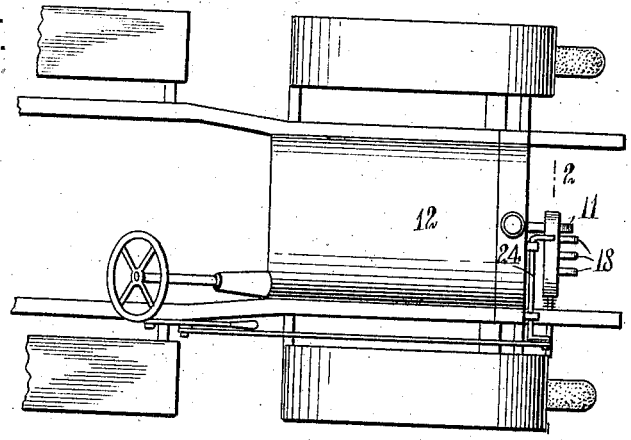
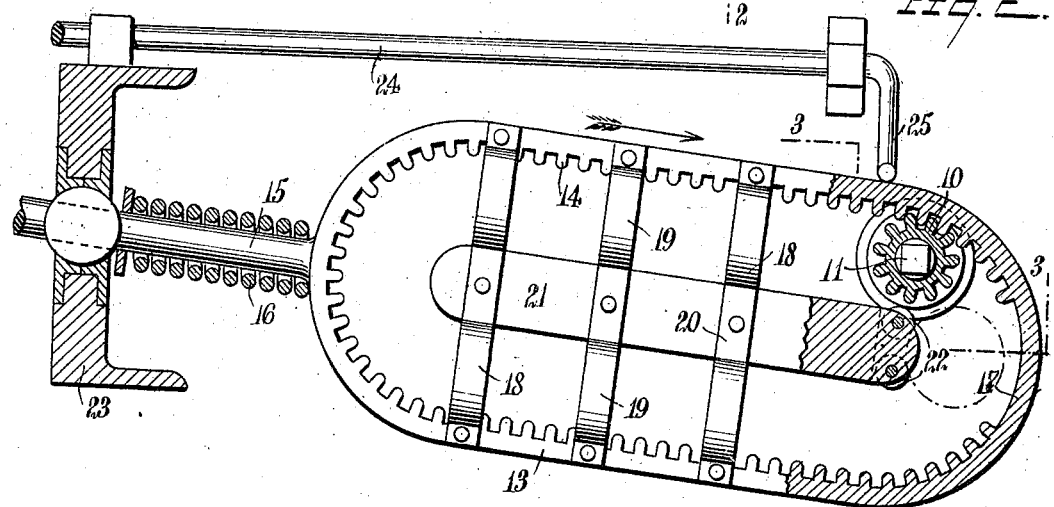
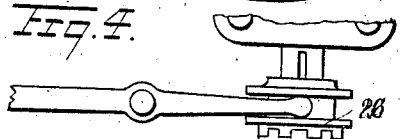
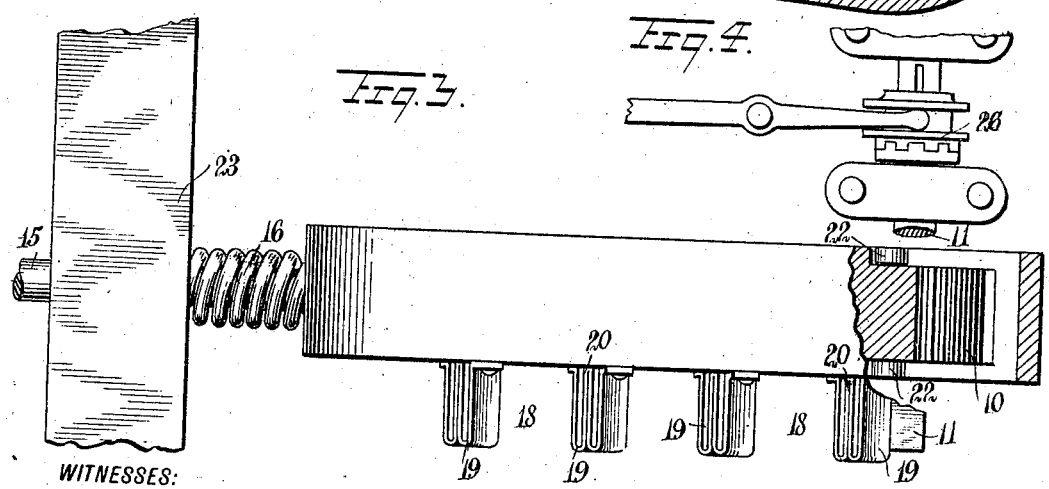
WITNESSES:
H. J. Walker
INVENTOR
John Pryor Looney
BY
ATTORNEYS

UNITED STATES PATENT OFFICE.

JOHN PRYOR LOONEY, OF BUCKHOLTS, TEXAS, ASSIGNOR OF ONE-HALF TO WILLIAM ANDERSON McCORMICK, OF BUCKHOLTS, TEXAS.

STARTING DEVICE.

984,948. Specification of Letters Patent. Patented Feb. 21, 1911.

Application filed August 10, 1910. Serial No. 576,483.

*To all whom it may concern:*

Be it known that I, JOHN PRYOR LOONEY, a citizen of the United States, and a resident of Buckholts, in the county of Milam and State of Texas, have invented a new and Improved Starting Device, of which the following is a full, clear, and exact description.

The invention relates to starting devices particularly adaptable for internal combustion engines, and has for an object to provide a device for starting an engine by means of energy stored up by the said engine when previously in operation.

For the purpose mentioned use is made of a pinion for rigid attachment to one end of the shaft of an engine, an internally toothed rack operatively mounted on the pinion and provided with an extended rod in engagement with a spring, means on the rack for holding the pinion in an operative position relative to the rack, and means engaging the rack for connecting the rack and pinion, to release the said spring after the same has been substantially compressed.

Reference is to be had to the accompanying drawings constituting a part of this specification, in which similar characters of reference denote corresponding parts in all the views, and in which—

Figure 1 is a partial plan view of an automobile equipped with my device; Fig. 2 is a sectional view taken on the line 2—2 in Fig. 1; Fig. 3 is a sectional view taken on the line 3—3 in Fig. 2; and Fig. 4 is a fragmentary plan view of the cut-out clutch of my device.

Referring more particularly to the various views, I provide a pinion 10, rigidly mounted on a shaft 11, of an internal combustion engine mounted in an automobile 12, and constituting the driving medium for the automobile. A rack 13, having internal teeth 14, partially encircling the inner periphery of the rack, is provided with an extended rod 15 on which a spiral spring 16, is operatively disposed. A portion 17 of the rack 13, on the inner periphery thereof, is left blank or smooth and toothless, as will be easily seen in Fig. 2. A plurality of transversely extending supports 18 are secured to the rack 13, and consist of two loops 19, having a depending intermediate portion 20, to which is secured a longitudinally extending roller member 21, provided at one end with oppositely disposed similar rollers 22. On the frame 23 of the automobile 12, a rod 24 is mounted to turn, and terminates in an offset end 25 for engagement with the rack 13.

It will be understood, that in the operation of my device the energy for starting the engine is stored up by the engine while the same was in operation previous to stopping. Now supposing that the engine has started; the pinion 10 carried by the shaft 11 will rotate and consequently the rack 13 will operate on the pinion 10 until the blank portion 17, adjacent the starting point, is reached. As the blank portion 17 approaches the pinion, the rollers 22 engage the same, acting as guides, and the relative position of the rack and pinion when the blank portion is reached, is substantially shown in dotted lines in Fig. 2. It will now be seen that owing to the smooth surface of the portion 17, the rack 13 will cease to operate on the pinion 10, and it will be further noticed that during the travel of the rack over the pinion, the spring 16 has been gradually compressed. Now, if the engine is stopped and it is desired to re-start the same, the lever rod 24 is operated to move the end 25 against the rack 13. This movement of the lever rod causes the rack to exert a pressure against the pinion, and the said pinion turning on the rollers 22 permits the rack to move, and the pinion 13 is again engaged by the first of the teeth 14 on the rack. At the moment of contact between the teeth 14 and the pinion 10, the energy collected in the spring 16 is released, owing to the longitudinal pressure of the rack against the pinion being removed, and the rack 13 operates over the pinion 10, which rotates and in turn rotates the shaft 11, thus working the pistons of the engine and operating the necessary engine parts to start the same. After the engine is started and is operating in the regular manner, the rack 13 moves over the pinion as previously mentioned, and the spring 16 is again compressed until the smooth or blank portion 17 engages the pinion, thus stopping the movement of the rack.

By providing a clutch member 26 for connection between the shaft of the engine and my starting device, the starting device can be at any moment disconnected from the shaft, thus enabling the operator to crank the engine in the usual manner.

Having thus described my invention, I claim as new and desire to secure by Letters Patent:—

1. A starting device comprising a pinion mounted to turn with the shaft of an engine, a toothed rack having a blank portion and engaging the pinion to be operated thereby, a plurality of transversely extending supports secured to the said rack, a roller member centrally secured to the said supports and extending longitudinally to the said rack, a plurality of rollers mounted on the said roller member and adapted to be engaged by the said pinion to hold the same on the said blank portion of the rack and a spring mounted on the rack and adapted to compress when the pinion operates the rack.

2. A starting device comprising a pinion mounted to turn in the shaft of an engine, a rack provided with a blank portion and engaging the pinion to be operated thereby to compress a spring, a plurality of transversely extending supports on the pinion, a roller member secured to the supports, rollers on the roller member and adapted to be engaged by the pinion when the same moves onto the said blank portion of the rack and a lever for engagement with the said rack to release the said spring to operate the pinion after the same has moved onto the blank portion of the said rack.

In testimony whereof I have signed my name to this specification in the presence of two subscribing witnesses.

JOHN PRYOR LOONEY.

Witnesses:
W. F. SHARP,
M. M. MOORE.